United States Patent

[11] 3,580,371

| [72] | Inventors | Harold O. Kron<br>Philadelphia;<br>John K. Liu, Valley Forge; Edward Behnke, King of Prussia, Pa. |
|---|---|---|
| [21] | Appl. No. | 866,916 |
| [22] | Filed | Oct. 16, 1969 |
| [45] | Patented | May 25, 1971 |
| [73] | Assignee | King of Prussia Research and Development Corporation<br>King of Prussia, Pa. |

[54] SELF-SYNCHRONIZING CLUTCH
9 Claims, 13 Drawing Figs.

[52] U.S. Cl. .................................................. 192/18A,
192/48.7, 192/53B, 192/103F
[51] Int. Cl. ...................................................... F16d 23/04,
F16d 23/10
[50] Field of Search ........................................ 192/18 A,
48.5, 48.7, 53, 53 B, 103, 103 F, 67 A

[56] References Cited
UNITED STATES PATENTS

| 1,755,769 | 4/1930 | Carhart | 192/53B |
| 2,554,740 | 5/1951 | Jellis et al. | 192/53B(X) |
| 2,976,974 | 3/1961 | Blyth | 192/67A |
| 3,063,529 | 11/1962 | Cook | 192/48.5(X) |
| 3,249,187 | 5/1966 | McDowall | 192/53B(X) |
| 3,460,656 | 8/1969 | Swanson | 192/48.7(X) |

*Primary Examiner*—Allan D. Herrmann
*Attorney*—Paul & Paul

ABSTRACT: Clutch means are disclosed comprising a friction clutch in parallel with a positive-drive dental clutch assembly. The friction clutch is first engaged to bring the driven member up to the speed, or almost to the speed, of the driving member. The dental clutch is then engaged to provide a positive drive. The dental clutch assembly includes a sliding helical gear element for automatically aligning the teeth of the dental clutch prior to engagement. Brake means are provided for braking the rotational speed of the slidable clutch element.

INVENTORS.
HAROLD O. KRON
JOHN K. LIU
EDWARD BEHNKE
BY
Paul & Paul
ATTORNEYS.

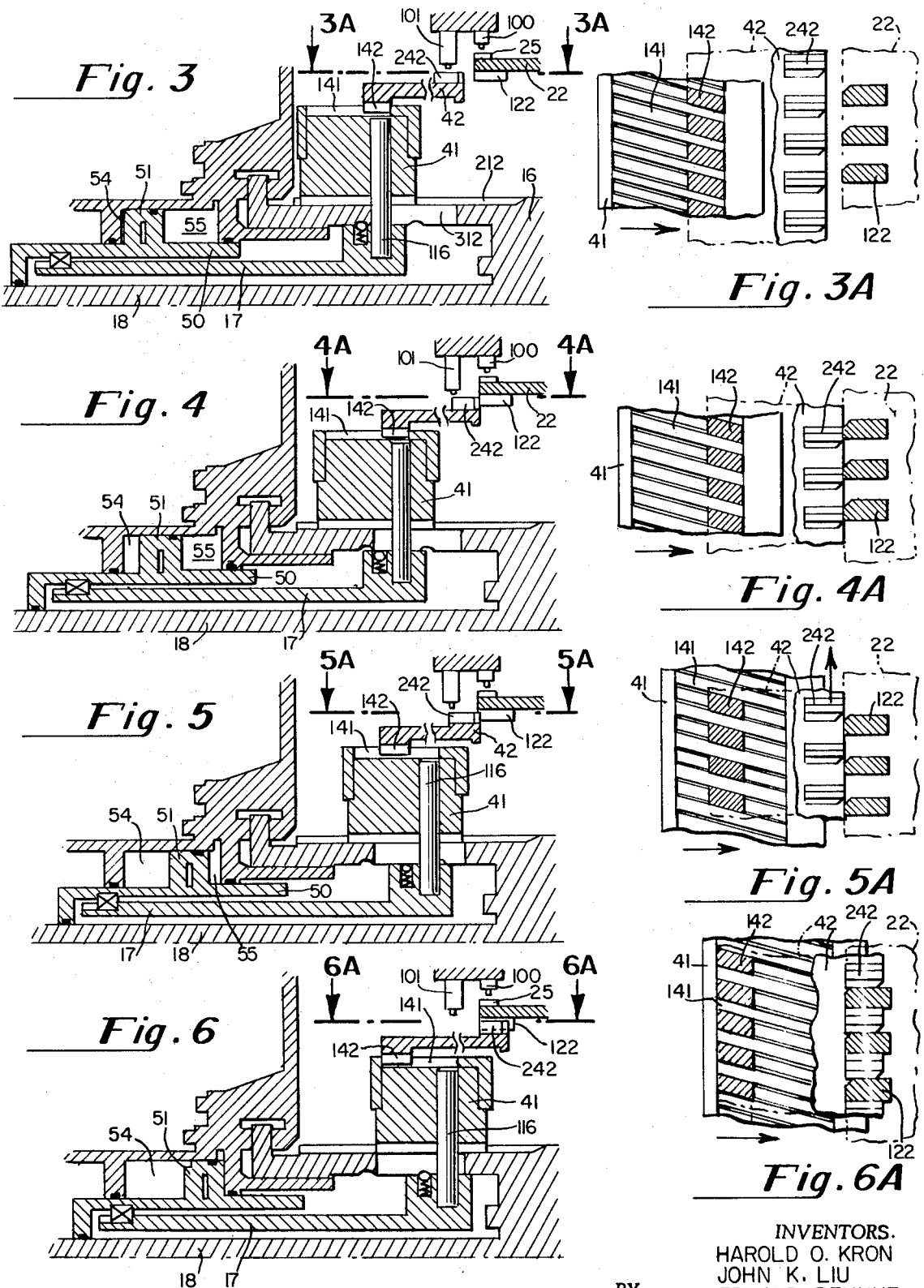

INVENTORS.
HAROLD O. KRON
JOHN K. LIU
EDWARD BEHNKE

BY Paul & Paul
ATTORNEYS.

SELF-SYNCHRONIZING CLUTCH

BACKGROUND OF THE INVENTION

The present invention relates to clutches for connecting or disconnecting a driven member from a driving member.

The invention relates particularly to clutch means for coupling together two members which are initially at different speeds, without regard to which is slower. One of the members may initially be at rest.

The invention further relates to positive-drive clutches designed to meet the heavy-duty synchronizing requirements of industrial, marine and military installations.

Prior art clutches of the type here involved have been difficult to service. In prior art clutches involving both friction and positive drive dental clutches, the positive clutch has been remote from ready access and hence difficult to reach for service.

SUMMARY OF THE INVENTION

The present invention provides clutch means which includes a friction clutch in parallel with a positive-drive dental clutch. The dental clutch assembly is located close to the access cover and upon removal thereof is readily available for servicing. The dental clutch assembly is connected to either the driving or driven member through radial pins which couple a slidable dental clutch assembly to a piston-actuable slidable shift member.

In operation, the friction clutch is first engaged to force the driving and driven members into rotation at the same, or substantially the same, speed. When the driving and driven members have attained a speed differential of only about one-half percent, a transistorized speed control signals for the dental clutch to be engaged. A dental clutch piston is then operated by air (or oil) pressure to shift a slidable helical gear element of the dental clutch assembly in the axial direction to effect axial motion, rotational movement, or a combination thereof, of the teeth of one of the dental clutch elements and move said element into meshing alignment with the other dental clutch element. A brake is provided (optionally) for braking one element of the dental clutch.

BRIEF DESCRIPTION OF THE DRAWINGS

FIGS. 3 through 6 are a series of diagrammatic sectional views showing how the dental clutch becomes progressively engaged;

FIGS. 3A through 6A are a series of diagrammatic illustrations corresponding to FIGS. 3 through 6 and showing in further progressive detail how the sliding helical gear member effects engagement of the teeth of the dental clutch;

DESCRIPTION OF THE PREFERRED EMBODIMENTS

Figure 1:
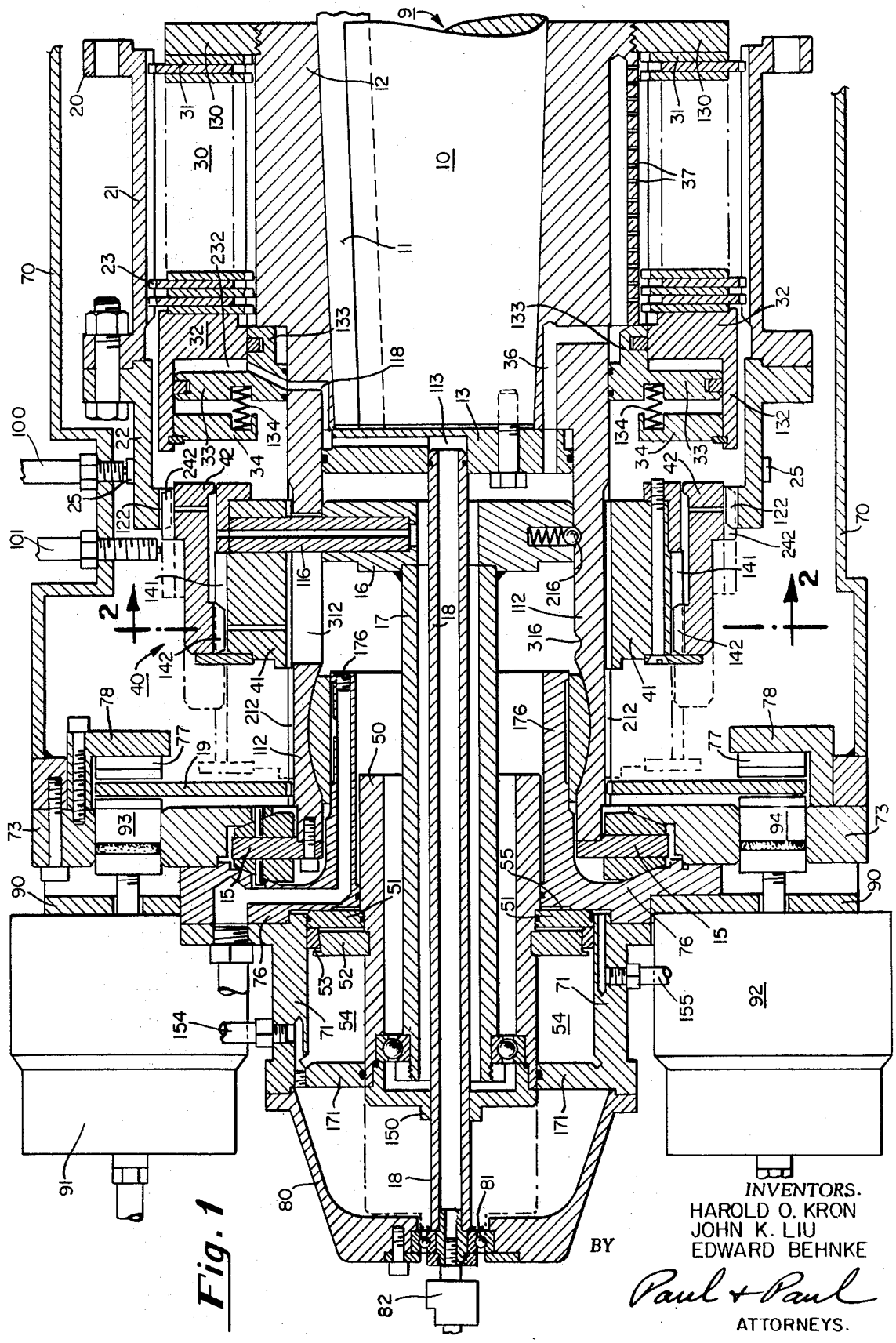
FIG. 1 is a longitudinal cross-sectional view of the synchronizing clutch as applied to a quill shaft form of drive.

Referring now to FIG. 1, there is shown a quill shaft assembly 9 comprising a hub shaft 10 keyed by key 11 to a hollow cylindrical quill 12 which projects axially beyond the end of the shaft 10 (the left as viewed in FIG. 1) forming a neck portion 112. Secured to the left end (as viewed in FIG. 1) of the neck portion 112 is an annular thrust collar 15. The exterior surface of the neck 112 of quill 12 is provided with splines 212. Connected to neck 112 by the splines 212 is an annular brake disc 19 and a helical ring gear 41 which is a component part of a dental clutch assembly 40.

Secured as by bolts to the left end (as viewed in FIG. 1) of hub shaft 10 is a retainer plate 13 having a central recess 113 which receives the end of an elongated tube 18. Transversely disposed about tube 18, within the bore of neck 112, is a push disc 16 having a recess in its left surface (as viewed in FIG. 1) which receives the end of a tubular push rod 17 which encircles a portion of tube 18 at spaced separation therefrom.

Figure 2:
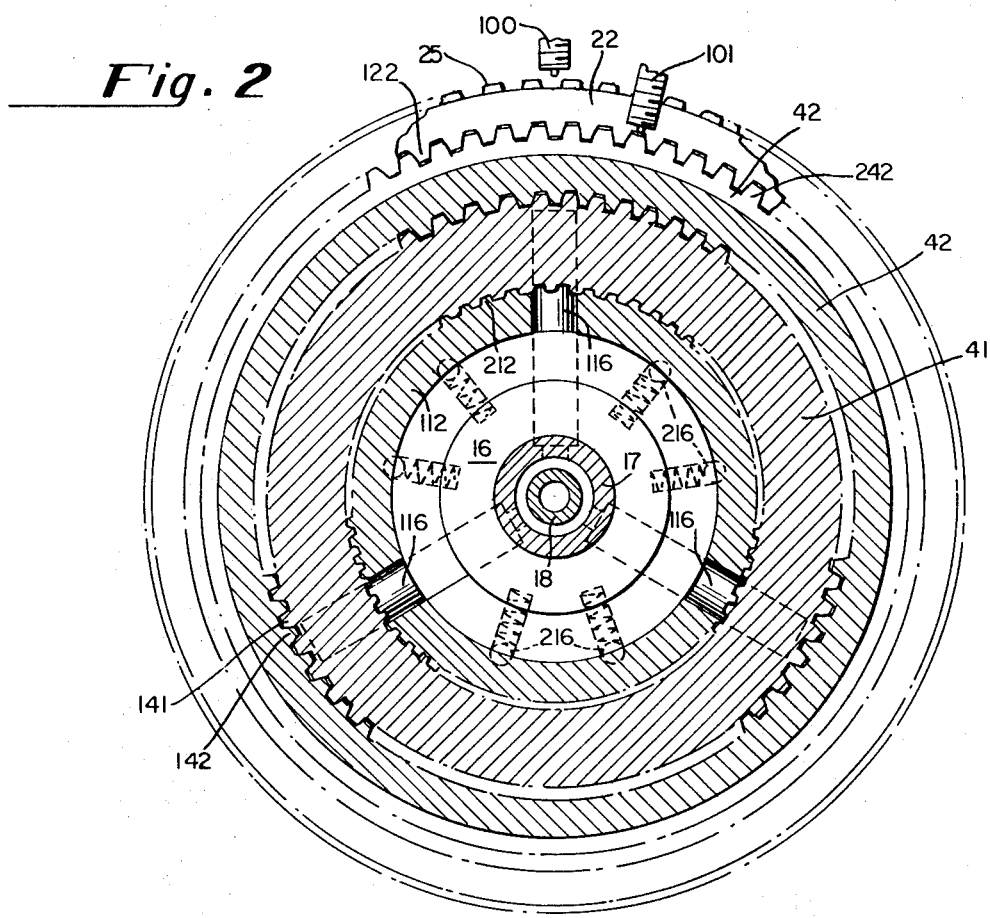
FIG. 2 is a transverse cross-sectional view along the line 2-2 of FIG. 1.

Carried by push disc 16 and projecting radially therefrom are three steel pins 116, at 120° separation, as seen in FIG. 2. These radial pins 116 project through slots 312 provided in neck 112 of quill 12. The purpose of slots 312 is to allow for movement of the pins 116 in the axial direction relative to the neck 112.

The external surface of the left-hand portion (as viewed in FIG. 1) of the helical ring gear 41 of the dental clutch assembly 40 is provided with helical gear teeth 141 which engage with helical gear teeth 142 provided on the interior surface of a ring sleeve gear 42. The exterior surface of sleeve gear 42 is provided at one end (the right end as viewed in FIG. 1) with spur gear teeth 242.

Secured to quill 12 (at the right end thereof as viewed in FIG. 1) are component parts of a friction clutch 30, including a thrust plate 130 and the spaced-apart multiple friction discs 31 of annular shape. Also secured to the quill 12 and forming a component part of the friction clutch assembly 30 is an annular clutch piston 32 having a flange 132 which receives and carries an annular balance plate 34 having a recess therein for receiving one end of coil springs 134. The other end of coil spring 134 is received in an axially fixed collar 33 which encircles quill 12 and has a portion 133 which abuts against a shoulder of the quill 12.

All of the component parts thus far described are connected to and move rotationally with the rotating hub shaft 10.

The rotatable mechanism described above is housed within a housing 70 having at one end thereof (the left end as viewed in FIG. 1) an annular housing plate 73 which supports a fixed hollow T-shaped support member 76 having a cylindrical leg portion 176 which is received within the bore of neck 112 of quill 12. Secured, as by bolts, to housing 73 is a brake bracket 78 to which is fixed a friction puck 77.

Secured to the head portion of the fixed hollow T-shaped support member 76 is a fixed cylindrical housing member 71 having an end flange 171. Supported within the T-member 76 is a cylindrical piston rod 50 having projecting radially therefrom, near the axial center thereof, an annular dental piston 51 which, on one side, abuts against a shoulder formed in the piston rod 50. On the other side of the annular dental piston 51 (the left side in FIG. 1) are a pair of wedge members 52, 53, which function as a wedge lock, as will be described later. The end of the cylindrical piston rod 50 is provided with a seal member 150 which bears on the tube 18. The outer wall of the cylindrical piston rod 50 is guided by the annular flange 171 of the cylindrical housing member 71 and by the T-shaped member 76. A housing cap 80 is connected to the fixed member 71. Bearings 81 on the housing cap 80 support the elongated tube 18 at one end for rotation. Outside the housing cap 80, in alignment with the rotatable tube 18 on the center axis of hub shaft 10, is a rotary union 82.

Also supported on the head of the head of the T-shaped support member 76 is bracket 90 which supports a pair of air cylinders 91 and 92 for actuating the brake pistons 93 and 94. The brake pistons 93 and 94 project through openings in the annular housing plate 73. The pistons are provided at their ends with friction pads so that when the brake pistons 93 and 94 are projected outwardly they press the friction pads against the brake disc 19 and force the brake disc into engagement with the brake pads carried on the pucks 77 on bracket 78.

The driven member is not shown in FIG. 1, but is assumed to be a hollow cylindrical member connected, as by bolts, to the output flange 20. Output flange 20 is an annular flange which is an integral part of a cylindrical member 21 connected, as by bolts, to an output ring gear 22 having on its interior surface at the one end thereof (the left end as viewed in FIG. 1) gear teeth 122 adapted to intermesh (when the dental piston is in the engaged position) with the gear teeth 242 of the ring sleeve gear 42. The cylindrical output member 21 carries on its internal surface a series of spaced-apart plates 23 which are interleaved with the friction discs 31 of the friction clutch 30.

In the foregoing description, and in the description of the operation which is given below, it is assumed that the hub shaft 10 is the drive element and that the flange 20 is connected to the output element. The reverse could, however, be true.

The output ring gear 22 is provided on its exterior surface with teeth 25 and mounted on the housing 70 adjacent to the teeth 25 is a magnetic sensing element or proximity pickup 100 whose function is to produce an electrical pulse as each tooth passes, thereby to produce an electrical signal whose frequency is a function of the speed of rotation of the output ring gear 22, and hence a function of the speed of the output flange. Also supported on the housing 70 is a second proximity pickup 101 positioned adjacent the teeth 242 of the dental sleeve gear 42, as seen in FIG. 3. The function of the proximity pickup 101 is to produce electrical pulses having a frequency which is a function of the speed of rotation of the dental sleeve gear 42, and hence a function of the speed of the hub shaft 10. The number of teeth 25 on the output ring gear 22 is made equal to the number of teeth 242 on the dental sleeve gear 42 so that the difference between the number of pulses generated by the magnetic proximity pickup devices 100 and 101 is directly related to the difference between the speeds of rotation of output flange 20 and input hub shaft 10.

In FIG. 1 described above, the dental clutch 40 is shown in fully engaged position. Reference is now made to FIGS. 3–6 which are a progressive series of diagrammatic illustrations showing the sliding movement of the dental clutch 40 from the fully disengaged position, shown in FIG. 3, to the fully engaged position, shown in FIG. 6. Further details of the progressive action of the dental clutch are given in FIGS. 3A, 4A, 5A and 6A, which is a progressive series of diagrammatic representations related to FIGS. 3—6.

So that the utility of the synchronizing clutch of the present application may be fully understood, it will be assumed that input hub shaft 10 and all of the elements which comprise the quill shaft assembly 9, are rotating at some predetermined speed and that the output flange 20 is at rest. Such a situation may obtain, for example, in large marine propulsion systems. This permits the prime mover and quill shaft assembly 9 to be run at sufficient speed in port so that the electric generators and other auxiliary equipment may be operating to provide various services, while the propeller connected to the output flange 20 is at rest. The synchronizing clutch of the present invention permits the ship to get under way substantially instantly by clutching in the propeller while the drive shaft 10 is rotating. However, as will be explained later, means are provided to prevent clutching in the propeller if the driving shaft 10 is rotating at a speed in excess of a predetermined speed. Ordinarily, the operator will slow down the speed of the driving hub shaft 10 to a predetermined reasonable speed before clutching in the output flange.

Figure 7:
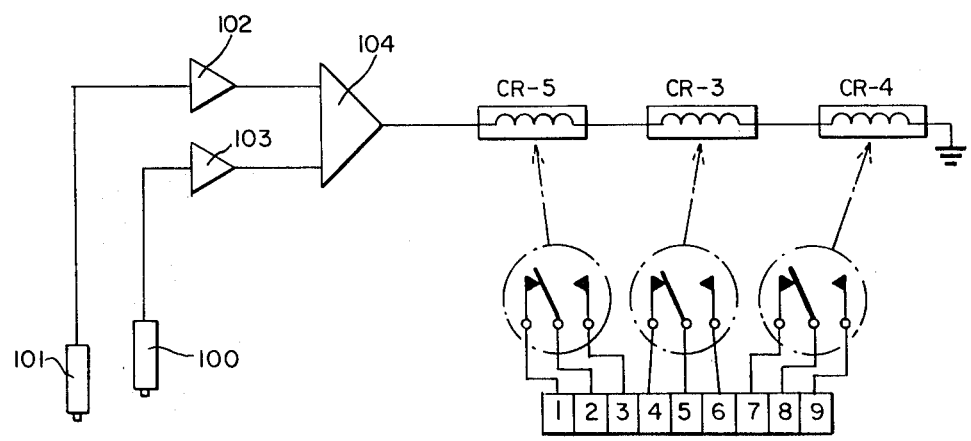
FIG. 7 is a circuit diagram relating to the sensing of the relative speeds of the drive and driven shafts and the actuation of speed-differential relays.

FIG. 7 is a schematic diagram of circuit means used to detect the difference in the speeds of rotation of the input hub shaft 10 and the output flange 20. As has already been indicated, when the input hub shaft 10 is rotating, the sleeve gear 42 of the dental clutch assembly 40 is also rotating, being driven through the rotating quill neck 112, the radial pins 116, the gear 41, and the helical teeth 141 and 142. As the individual gear teeth 242 of the dental sleeve gear 42 (see FIG. 3) pass by the proximity pickup 101 magnetic lines of force are cut and electrical pulse signals are generated. The frequency of these signals is, of course, dependent upon the speed of rotation of the hub shaft 10. Assume that the dental clutch 40 is not engaged and that the output flange 20 is being driven through the friction clutch 30. The speed of rotation of the output flange 20 is sensed by the proximity pickup 100 which is adjacent to the teeth 25 on the output ring gear 22. The electrical pulses generated by each of the proximity pickups 101 and 100 are amplified in amplifiers 102 and 103, and then applied to a differential amplifier 104. The output of the differential amplifier 104 is a signal whose frequency is dependent upon the difference in the frequencies of the pulses generated by the two proximity pickups. The difference signal is passed in series through the windings of relays CR5, CR3 and CR4. Relay CR4 is so adjusted that if the frequency of the difference signal corresponds to a difference in the speeds of hub 10 and flange 20 of greater than say 1,100 r.p.m., the normally closed contacts CR4–1 in FIG. 9 will open. Relay CR5 is so adjusted that if the frequency of the difference signal corresponds to a difference in rotational speeds of greater than say 2,200 r.p.m., the normally closed contacts CR5–1 will open. Relay CR–3 is so adjusted that its contacts CR3–1 are normally open and do not close until the difference in shaft speeds is, for example, less than 5 to 11 r.p.m.

OPERATION

Figure 9:
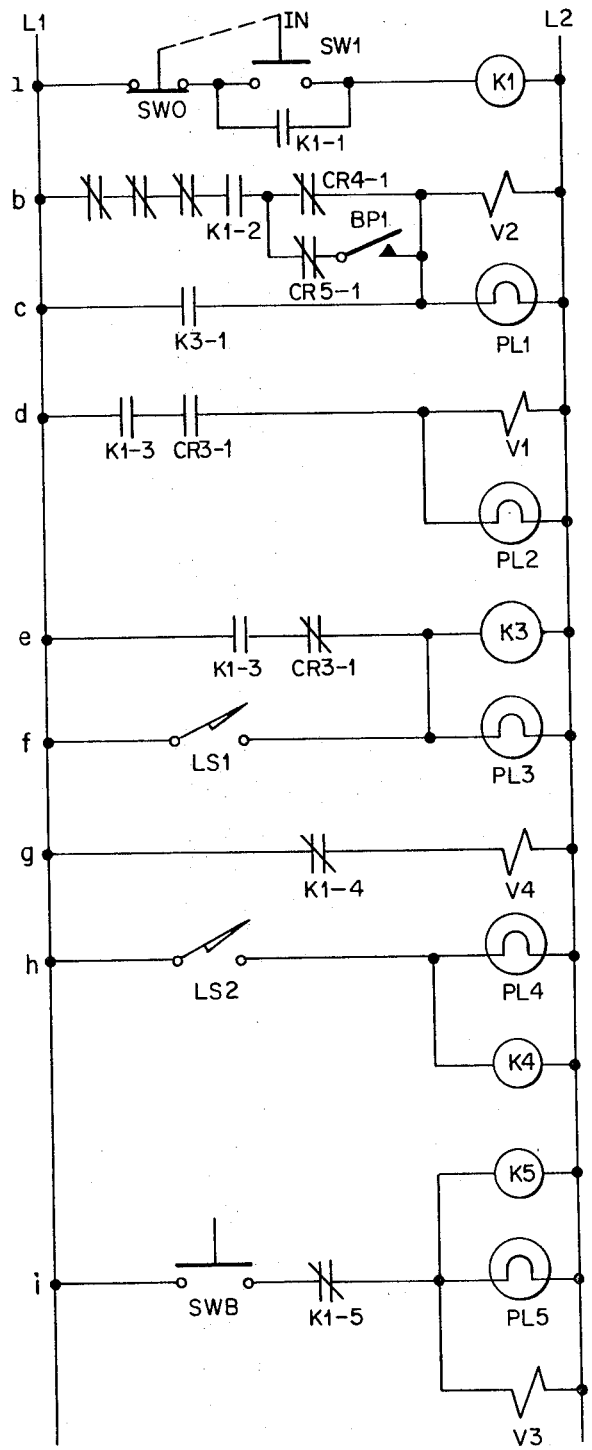
FIG. 9 is a circuit diagram of the electrical control system.

In the description which follows, reference is made from time to time to the circuit diagram in FIG. 9. In FIG. 9, all relay contacts are shown in the positions taken when the relay is deenergized.

Assume that hub shaft 10 is the input member and that it is rotating but that neither the friction clutch 30 nor the dental clutch 40 are engaged. Thus, the output member (which is connectable to flange 20) is not rotating. Assume that the operator now desires to clutch in the output member. The operator does this by closing switch SW1 shown in branch *a* of FIG. 9. Closing switch SW1 closes the branch circuit *a* between power supply leads L1 and L2. Relay K1 is now energized, and its contacts K1–1 now close to lock in relay K1. The normally open contacts K1–2 in branch *b* close, contacts K1–3 in branch *d* close, and contacts K1–4 and K1–5 in branches *g* and *i* open. The circuit through branch *b* will be assumed to be closed upon the closing of contacts K1–2, thereby energizing the solenoid valve V2. It will be observed, as explained heretofore, that if the speed of the input shaft 10 is, at this time, greater than say 1,100 r.p.m., the contacts CR4–1 of relay CR4 will be open and the solenoid valve V2 will not be energized until the operator reduces the speed of the input shaft 10 to below 1,100 r.p.m. On the other hand, if the operator desires to clutch in the output member even though the speed of the input shaft 10 is higher than 1,100 r.p.m., he may do so by closing switch BP1 to bypass the now open contacts CR4–1, since contacts CR5–1 of relay CR5 will be closed unless the speed of input shaft is above say 2,200 r.p.m.

Return now to the situation that solenoid valve V2 is energized by the closing of contacts K1–2. When this happens, oil is supplied to the rotary union 82 through the solenoid valve V2, as indicated diagrammatically in FIG. 8. Oil pressure is now applied through the bore of the tube 18 (FIG. 1) and the passages 118 to the piston chamber 232 located between piston 32 and the collar 33 of the friction clutch 30. As a result, the piston 32 moves to the right (as viewed in FIG. 1) thereby causing discs 31 to frictionally engage with the plates 23 of output flange 20. The output flange 20 now starts to rotate.

When the speed of rotation of the output flange 20 approaches closely to that of the hub shaft 10, relay CR3 operates. As previously mentioned, this relay may be adjusted to operate when the difference in the speeds of the input shaft 10 and output flange 20 is between 5 and 11 r.p.m. Contacts CR3–1 in branch *d* of FIG. 9 now close and, since the contacts K1–3 are already closed, the solenoid valve V1 is energized and the valve spool is shifted from the position shown in FIG. 8 to the right-hand position. As a result, the oil pressure, which previously has been applied through line 155 to the chamber 55 on the right side of the dental piston 51 and which had maintained the dental clutch in disengaged position, is now applied through line 154 to the chamber 54 on the left side of the dental piston 51 as viewed in the drawings. As a result, the dental piston 51 starts moving toward the right. This movement of dental piston 51 carries with it the piston rod 50 and push rod 17, which causes disc member 16 and radial pins 116 to move to the right. As is understood, pins 116 move in the slots 312 in the neck 112 of quill 12. All of these parts are rotating with the shaft 10.

Referring now to FIGS. 3, 4, 5 and 6, the dental piston 51, piston rod 50, push rod 17, radial pins 116 and dental helical ring gear 41, are all initially in the disengaged position, i.e. the left-hand position as shown in FIGS. 3 and 3A. As the dental piston 51 starts to move to the right, the radial pins 116 push the helical gear 41 toward the right, which carries sleeve gear 42 to the right. No resistance is initially offered to the movement of sleeve gear 42 to the right until the teeth 242 of the rotating sleeve gear 42 abut against the teeth 122 of the rotating ring gear 22, as shown in FIGS. 4 and 4A. Thereafter, as the movement of the piston, etc., to the right continues, relative movement between the helical inner gear 41 and the helical outer sleeve gear 42 occurs, as is illustrated in FIGS. 5 and 5A. Since the interengaging teeth on the two gears 41 and 42 are helical, the continuation of the sliding or shifting movement of gear 41 to the right after sleeve gear 42 is stopped from so moving, causes sleeve gear 42 to move angularly relative to gear 41, in the direction indicated by the arrow in FIG. 5A. It will be understood the angular movement of sleeve gear 41 just referred to is a rotational movement which is relative to gears 41 and 22, and that all of these gears are now rotating at substantially the same speed, for example, 800 r.p.m.

Angular movement of sleeve gear 42 relative to gears 41 and 22 continues until the teeth 242 of sleeve gear 42 are aligned with the spaces between the teeth 122 of the output ring gear 22. The continued sliding movement of the ring gear 41 in the axial direction then pushes the teeth 242 into engagement with the teeth 122, as shown in FIGS. 6 and 6A. To facilitate the intermeshing of teeth 242 with teeth 122, the edges of the teeth are beveled, as indicated.

When the dental clutch is fully engaged as just described, the spring-loaded ball detents enter the recesses 216, as seen in FIGS. 1 and 2, and a limit switch LS1 in branch *f* of FIG. 9 is closed, thereby energizing relay K3. The contacts K3-1 in branch *c* close to assure the flow of current through the winding of solenoid valve V2. This maintains the friction clutch 30 engaged during the entire period that the dental clutch 40 is engaged. The fact that the friction clutch is also engaged facilitates later disengagement of the dental-clutch teeth, when the operator opens the switch SW2 to shut down the output member. Oil is circulated to the discs of the friction clutch through passage 36 and ports 37 to remove heat and prolong the life of the clutch. It is to be understood, however, that, if desired, the friction clutch may be disengaged after the dental clutch is engaged.

As previously indicated, the dental piston 51 has a self-locking feature which prevents the dental piston rod 50 from backing off under torque reversal. It will be seen, if the dental clutch 40 tries to back out of engagement under torque reversal, that the disc 16, push rod 17, and piston rod 50 will be urged to move to the left, as viewed in FIG. 1, and that piston rod 50 will carry along wedge member 52 which will cam the other wedge member 53 in a radially outward direction, thereby causing a tight interference fit with the wall of fixed member 71. Thus, backoff under torque reversal is prevented by the wedge members 52 and 53. When, however, fluid pressure is applied to piston chambers 54 or 55 to move the piston rod 50, the wedge members 52 and 53 are compressed together, and the tight interference fit with the wall of member 71 is relaxed and becomes a sliding fit.

To disengage the clutches to shut down the output member 20, the operator opens switch SWO in branch *a* of FIG. 9. This deenergizes relay K1 and its contacts return to their normal positions shown in FIG. 9. Contacts K1-2 in branch *b* are now open. However, the solenoid valve V2 remains energized since limit switch LS1 is still closed, the relay K3 in branch *e* is still energized, and the contacts K3-1 in branch *c* are still closed. Thus, oil pressure is still applied to the friction clutch piston 32. However, when relay K1 became deenergized, the contacts K1-4 in branch *g*, which had been open, now return to closed position, thereby energizing solenoid valve V4. Simultaneously, the contacts K1-3 in branch *d* returned to open position, thereby deenergizing solenoid valve V1. As a result, the spool of valves V1—V4 shifts to the right and takes up the position indicated in FIG. 8. As a result, oil pressure is now applied to chamber 55, and dental piston 51 starts moving to the left. After the dental piston 51 has moved sufficiently to pull the dental clutch teeth 242 out of engagement with the dental clutch teeth 122, the limit switch LS1 opens. This deenergizes relay K3, and contacts K3-1 in branch *c* open. This deenergizes solenoid valve V2 and removes oil pressure from rotary union 82. As a result, the friction clutch piston 32 is moved to the left by reason of the expansion of the coil spring 134, and the friction clutch 30 becomes disengaged.

When the dental piston 51 has moved all the way to its "out" position (to the left in FIG. 1), the spring-biased ball detents enter the recesses 316, and in this position limit switch LS2 in branch *h* closes. This energizes relay K4, and the normally closed contacts K4-1 in branch *e* open.

Figure 8:
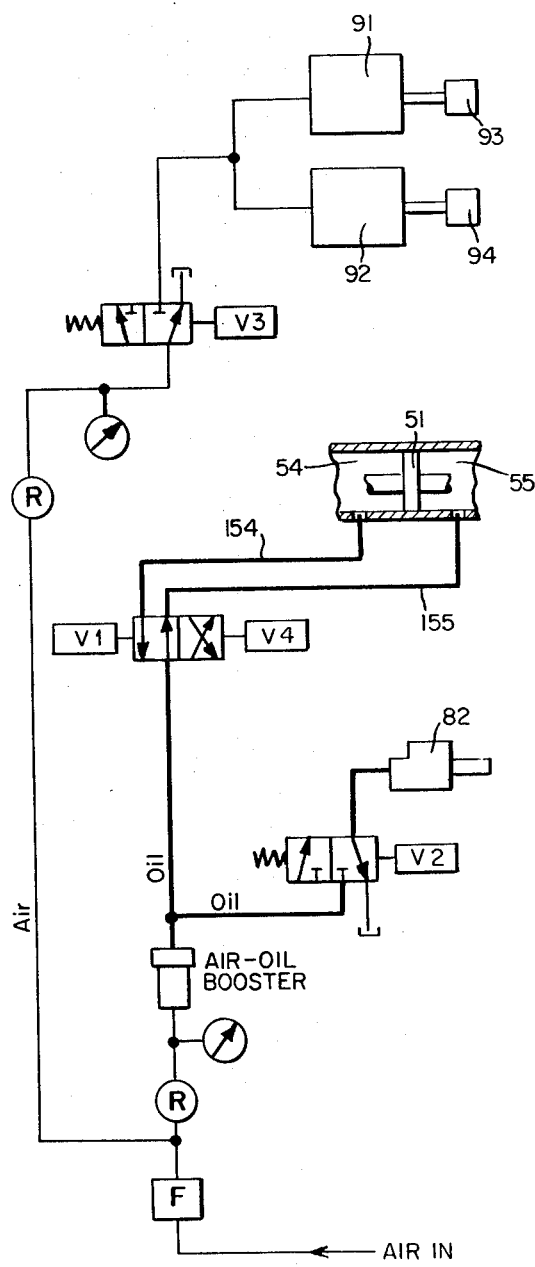
FIG. 8 is a circuit diagram of a portion of the pneumatic pressure system and of the oil-pressure system.

In some installations, a brake may be incorporated into the clutch housing to stop the quill 12 and hub shaft 10 from rotating, as otherwise the output member may continue to rotate due to residual drag torque within the friction clutch. The disc brake 19 shown in the present application is so incorporated into the mechanism as to require no additional length of housing. If the brake 19 is to be employed, the operator closes switch SWB in branch *i*. So long as relay K1 is energized, its contacts K1-5 will be open and the brake-coil valve solenoid V3 will not be energized. When, however, the switch SWO in branch *a* is opened by the operator to decouple the output member, the contacts K1-5 return to closed position, and the valve solenoid V3 is energized. This applies air pressure to the brake cylinders 91 and 92, as seen in FIG. 8 and the brake pistons 93 and 94 are extended to apply the braking force. Relay K5 functions as a brake interlock.

The schematic circuit diagram in FIG. 9 includes several signal lamps, not yet mentioned. These will be but briefly described. Lamp PL1 is the friction clutch ON lamp; PL2 is the sync lamp which indicates that the speed of the driven shaft is close to that of the drive shaft; PL3 is the dental clutch IN lamp; PL4 is the dental clutch OUT lamp; and PL5 is the brake ON lamp.

It will be seen from the foregoing description that the synchronizing clutch of the present application will synchronize and positively drive two shafts which are initially at different speeds without regard to which is slower. Either one may initially be at rest. It will also synchronize regardless of direction of shaft rotation. The clutch will continue to transmit power independently of external control power. Electrical control power and actuation pressure are required only during engagement and disengagement. The clutch provides high reliability and is capable of very high load capacity. The load-carrying teeth of the dental clutch are preferably nitrided steel to give maximum wear resistance.

Use of the clutch in marine applications has been referred to above. Another large use is in synchronous condensers where, when a sudden demand for peak power arises, a gas turbine has to be brought on line.

We claim:
1. A synchronizing clutch mechanism comprising:
 a. a rotatable drive member;
 b. a rotatable driven member;
 c. friction clutch means;
 d. pressure means for engaging said friction clutch means for frictionally coupling said drive and driven members;
 e. positive dental clutch means connected in parallel with said friction clutch means;
 f. said dental clutch means including first and second ring gear means, having respectively internal teeth and external teeth adapted to be intermeshed when axially aligned;

g. means connecting one of said ring gear means to one of said rotatable members and the other to the other of said rotatable members; said connecting means including:
   g-1. an axially slidable shift member;
   g-2. means including radially disposed rod members driven rotationally by said one of said rotational members and connecting said one of said ring gear means to said slidable shift member;
   g-3. means for shifting axially said slidable shift member;
   g-4. and means, including helical gear means, for moving said one ring gear means rotationally in response to axial sliding movement of said shift member, thereby to align the gear teeth of said first and second ring gear means for intermeshing engagement.

2. Apparatus according to claim 1 characterized in that:
   a. said one ring gear means comprises an inner ring gear having external helical teeth and an outer sleeve gear having internal helical teeth engaged with the helical teeth of said inner ring gear, said outer sleeve gear having external teeth for engagement with the internal teeth of said other ring gear means.

3. Apparatus according to claim 2 characterized in that said radially disposed rod members connect said inner ring gear to said slidable shift member.

4. Apparatus according to claim 3 characterized in that said shifting means includes fluid-pressure-actuated piston means, and bearing means connecting said piston means to said slidable shift member.

5. Apparatus according to claim 4 characterized in that wedge-lock means are provided on said piston means to prevent said piston means from backing off in response to torque reversal thrust forces when said first and second ring gear means of said dental clutch are engaged.

6. Apparatus according to claim 5 characterized in the provision of:
   a. means for detecting the relative rotational speeds of said drive and driven members and for developing an electrical difference signal which is a function of the difference in the said speed;
   b. means responsive to said difference signal for actuating said piston means for moving said slidable shift member axially thereby to slide said one ring gear means axially relative to said other ring gear means.

7. Apparatus according to claim 6 characterized in the provision of:
   a. disc brake means including a disc and friction pads;
   b. means coupling the disc to one of said rotatable member;
   c. piston means for controlling the engagement of said brake means with said friction pads.

8. A synchronizing clutch mechanism comprising:
   a. first and second rotatable means, one of which functions as the drive means and the other as the driven means;
   b. friction clutch means for coupling together said first and second rotatable means for bringing the driven means up to a rotational speed approaching that of the drive means;
   c. an internally toothed ring gear connected to said first rotatable means and connectable to said second rotatable means through said friction clutch;
   d. positive dental clutch means connected to said second rotatable means, said dental clutch means including;
      d-1. a first ring gear slidably mounted on said second rotatable means and having external helical teeth;
      d-2. a sleeve ring gear encircling said first ring gear and having internal helical teeth in mesh with the helical teeth of said first ring gear;
   e. slidable shift means including fluid operated piston means;
   f. means, including a plurality of radial pins, connecting said shift means to said first ring gear for slidingly shifting said first ring gear axially relative to said second rotatable means;
   g. said sleeve ring gear being adapted to move both rotationally and axially in response to axial shifting of said first ring gear;
   h. said sleeve ring gear having external gear teeth adapted, when said first ring gear is slidingly shifted, to be carried into intermeshing engagement with the internal gear teeth of said ring gear connected to said first rotatable means.

9. A synchronizing clutch mechanism comprising:
   a. a rotatable input member;
   b. a rotatable output member;
   c. friction clutch means for interconnecting said input and output members;
   d. positive clutch means connected in parallel with said friction clutch means for interconnecting said input and output members;
   e. said positive clutch means including a pair of ring gear means, one having external teeth and the other internal teeth;
   f. means mounting one of said ring gear means for sliding axial movement relative to the other;
   g. said one ring gear means comprising an inner ring gear having helical external teeth and an outer sleeve gear having internal helical teeth intermeshed with the external helical teeth of said inner ring gear;
   h. said mounting means including a plurality of radial members interconnecting said inner ring gear with one of said rotatable members.